(No Model.)
L. LOHMAN.
ARRANGEMENT OF ARTESIAN WELLS AND DEVICES CONNECTED THEREWITH FOR ACTUATING WATER WHEELS.
No. 372,690. Patented Nov. 8, 1887.
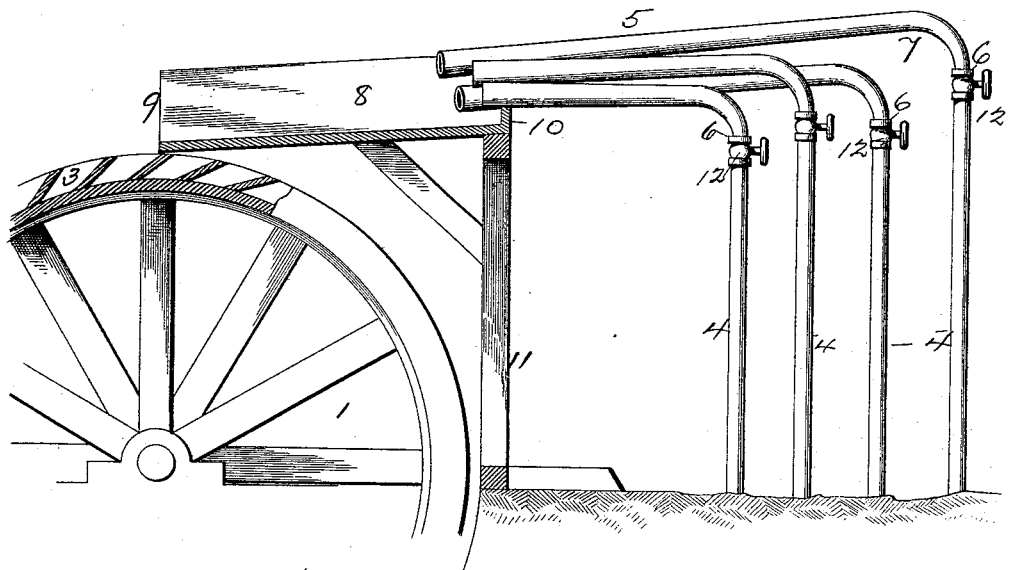
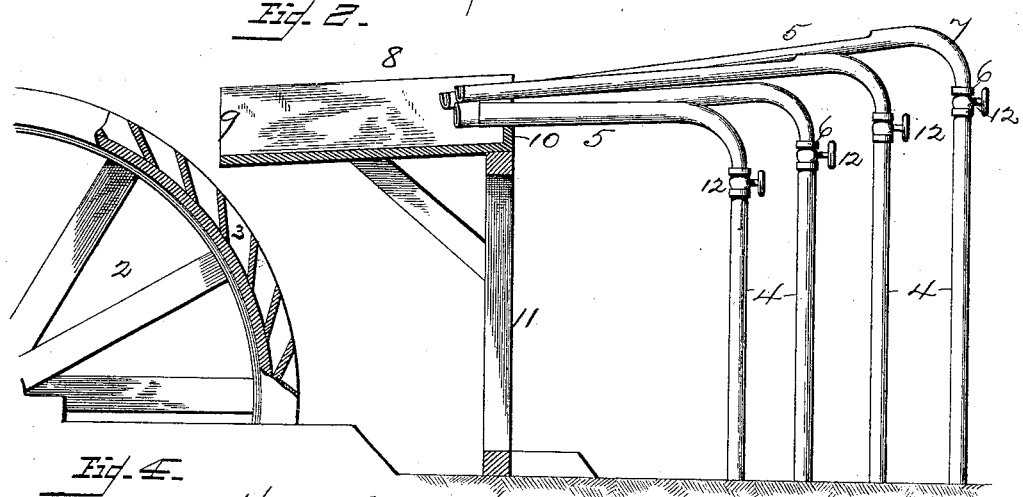
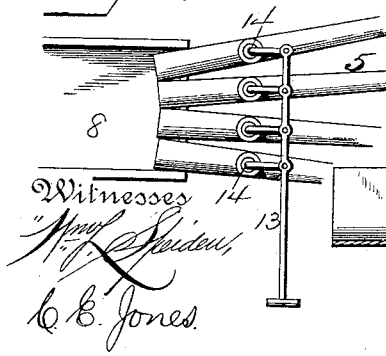
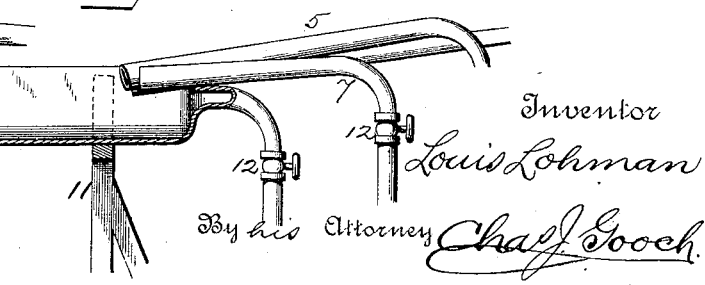

UNITED STATES PATENT OFFICE.

LOUIS LOHMAN, OF JACKSONVILLE, FLORIDA.

ARRANGEMENT OF ARTESIAN WELLS AND DEVICES CONNECTED THEREWITH FOR ACTUATING WATER-WHEELS.

SPECIFICATION forming part of Letters Patent No. 372,690, dated November 8, 1887.

Application filed May 27, 1887. Serial No. 239,556. (No model.)

*To all whom it may concern:*

Be it known that I, LOUIS LOHMAN, a citizen of the United States, residing at Jacksonville, in the county of Duval and State of Florida, have invented a certain new and useful Arrangement of Artesian Wells and Devices Connected therewith for Actuating Water-Wheels; and I do hereby declare the following to be a full, clear, and exact description of the invention, such as will enable others skilled in the art to which it appertains to make and use the same.

This invention relates to a novel arrangement of Artesian or driven wells and devices connected therewith for securing the actuation of water-wheels.

The improvement, briefly described, consists in forming and arranging a series composed of two or more Artesian or driven wells in more or less close proximity to each other, and connecting them, by means of pipes, with a single run or conduit supported with its front or discharge end in suitable position above the buckets of either an overshot or undershot water-wheel, the tubes of said wells each having a stop-cock to regulate the flow of water therethrough to the pipe connected therewith, and said pipes having stop-cocks connected to an actuating-rod for regulating the supply of water to the water-wheel, all as hereinafter set forth.

In the accompanying drawings, Figure 1 represents, in side elevation, an overshot water-wheel for driving machinery or imparting power to any desired mechanism and a series of driven wells connected by a series of pipes with a single runway or trough in proximity with the wheel, whereby the flow of water from the several wells is brought together into a single stream and thus supplied to the wheel-buckets to cause the rotation of such wheel. Fig. 2 represents the adaptation of the invention to an undershot wheel. Fig. 3 represents a modification; Fig. 4, a detail view.

1 represents an overshot and 2 an undershot water-wheel of ordinary construction.

3 represents the buckets; 4 4, the tubes of a series of Artesian or drive or self-flowing wells.

5 represents tubes or pipes, of either circular or semicircular form in cross-section, secured at their inner ends by threaded nuts or rings 6, turning on threaded ends of the tubes 4 and 5, or by other suitable means. The rear ends of the tubes 5 are curved, as shown at 7, and are of smaller circumference at their rear than for the remainder of their length, so as to increase the suction of the water through the tubes 4. From the ends 7 said tubes 5 extend forward horizontally in an angular direction, as shown, to and discharge into a run or trough, 8, which, in the arrangement represented in Fig. 1, extends partly across the top of the wheel, so as to discharge the combined streams of water from the series of wells into the bucket which for the time being is the operative bucket. This run or trough 8 has upwardly-extending vertical side walls, 9, and a similar rear wall, 10, to confine the water supplied thereto and prevent the same wasting. The pipes or tubes 5 may be either tubular throughout their length or they may for a portion or the whole of their length, forward of their curved rear ends 7, be of semicircular or square shape in cross-section. If desired, in lieu of using a run or trough, as 8, the lowermost tube 5 may be extended forward and be of sufficient width, transversely, to receive the supply of water from the rest of the supply-tubes 5 and supply such combined streams to the wheel, as shown at Fig. 3. The forward ends of the tubes 5 rest upon the run or trough 8, which in turn is supported in its proper position upon a trestle, post or posts, or wall, 11, as found most suitable, according to the exigencies of each particular case. Where the run or trough 8 is dispensed with, the forward end of the lower tube 5 is supported upon a trestle or other suitable device, and the front ends of the remaining tubes 5 rested upon said lower tube.

Where hydraulic power is desired with which to run a water-wheel for transmitting motion to mechanism, and there is not a sufficiently forcible single flow of water available, I drive a series of wells in sufficiently close proximity to each other, and then connect such series of wells, by means of tubular or channel pipes 5, with a single conduit, which I arrange in close proximity to the wheel to be driven, so that the several streams of water from the several wells of the series shall be brought together into a single stream or volume. By this means, even though the flow from each individual well may be comparatively slow or sluggish, yet when the several streams are thus brought together the weight and volume of such streams so combined into a single stream will possess such force, power, and impetuosity as to readily cause the effective rotation of any water-wheel connected therewith.

It sometimes happens that it is desirable to shut off the supply of water to one or more of the pipes 5, so as to decrease the flow to the wheel-supply conduit. For this purpose I furnish each well-tube 4 with a stop-cock or valve, 12, by turning which the flow of water therethrough to the pipe 5 connected therewith will be stopped and the volume of the water supply to the wheel correspondingly lessened.

When it is desired to cut off the entire supply of water to the delivery-conduit for the purpose of stopping the rotation of the wheel, this can readily be accomplished by turning the rod 13, upon which are journaled stop-cocks, valves, or disks 14, within each pipe 5, near the forward ends thereof. In the former arrangement the supply can be regulated by parties at the wells, while in the latter arrangement the entire supply can be cut off by a single movement by parties adjacent to the wheel.

Having now described my invention, what I claim is—

The combination, with a water-wheel, of a series of wells arranged in juxtaposition to each other, a series of pipes connected at their rear ends to said wells and converging at their forward ends to supply the several streams from the respective wells in a single stream to said wheel, a stop-cock or valve connected to each of said wells adjacent to their connection with the discharge-pipes, a series of stop-cocks or valves individually located within the forward portion of said discharge-pipes, and a valve-rod connected to the series of such valves for the purpose of securing the unitary operation thereof, substantially as set forth.

In testimony whereof I affix my signature in presence of two witnesses.

LOUIS LOHMAN.

Witnesses:
   CHAS. J. GOOCH,
   S. A. TERRY.